Oct. 22, 1968  R. LION  3,406,752
METHOD OF FORMING TUBE PLATE BY ELECTRONIC WELDING
OF TUBES AND THE ARTICLE FORMED
Filed May 8, 1967  3 Sheets-Sheet 1
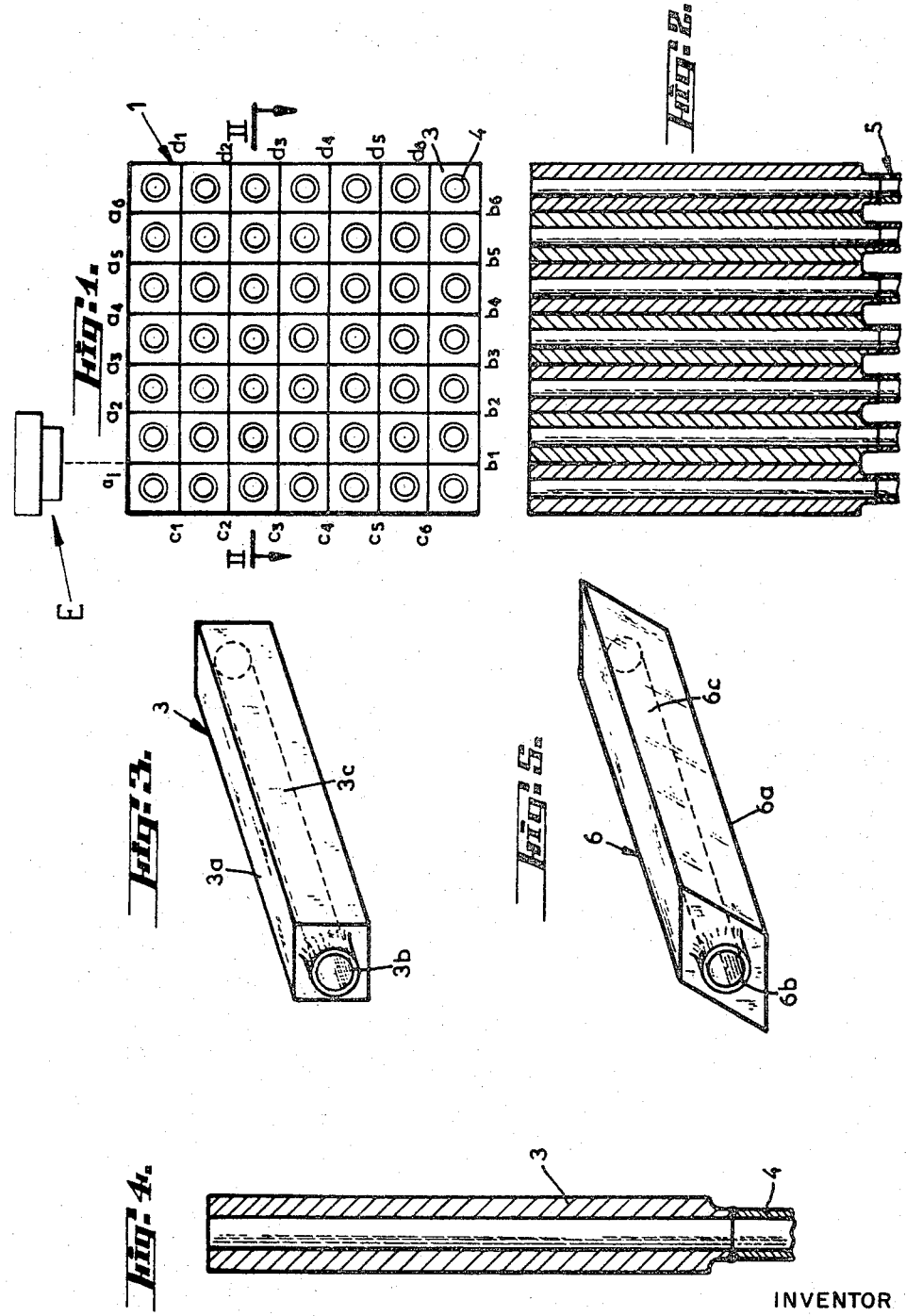
INVENTOR
RENÉ LION Oct. 22, 1968
R. LION
3,406,752
METHOD OF FORMING TUBE PLATE BY ELECTRONIC WELDING
OF TUBES AND THE ARTICLE FORMED
Filed May 8, 1967
3 Sheets-Sheet 2
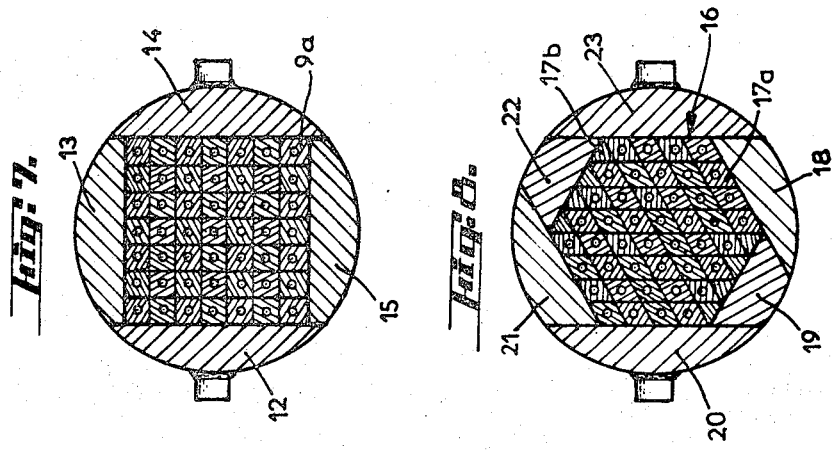
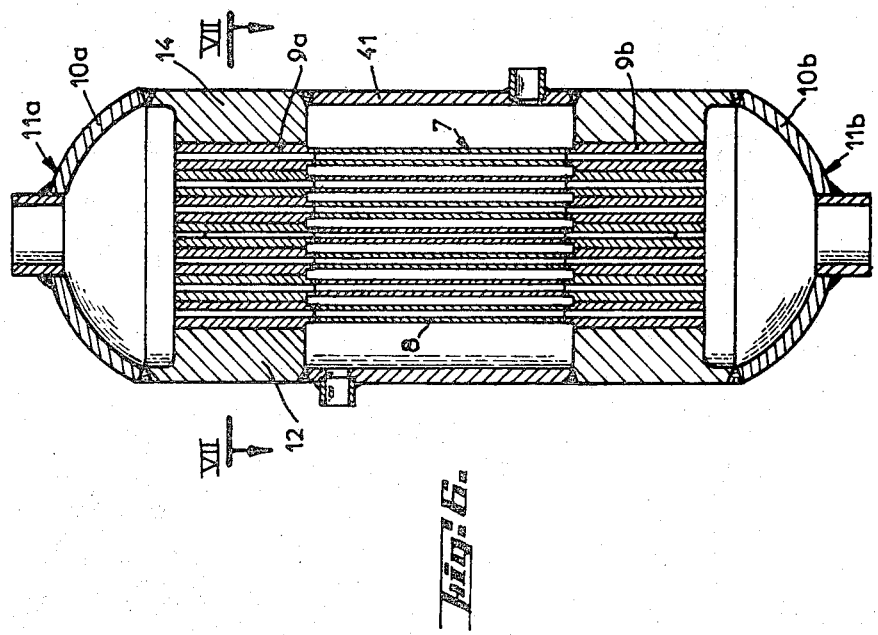

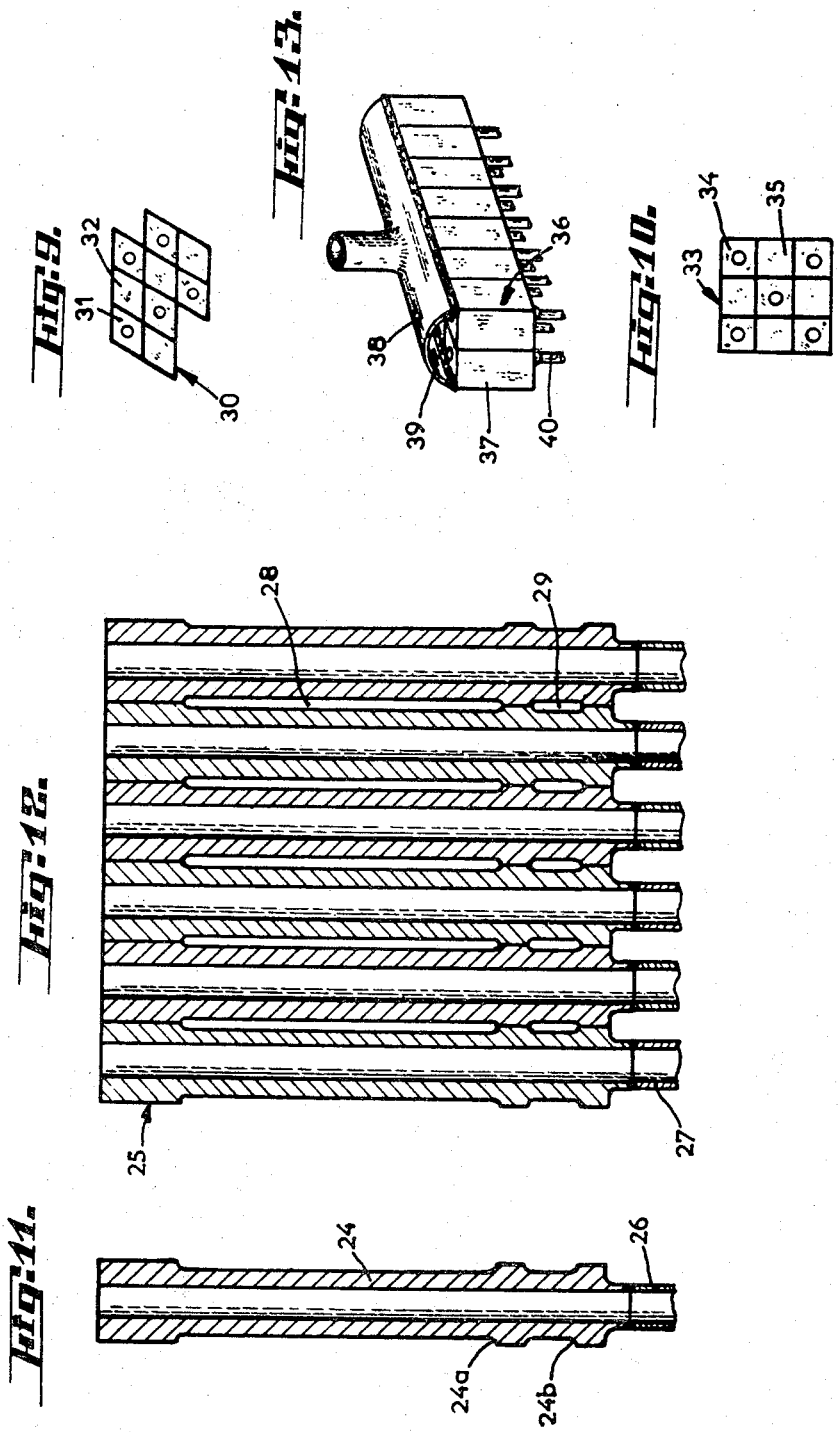

United States Patent Office 3,406,752
Patented Oct. 22, 1968

3,406,752
METHOD OF FORMING TUBE PLATE BY ELECTRONIC WELDING OF TUBES AND THE ARTICLE FORMED
René Lion, Garches, France, assignor to Fives-Penhoet, Paris, France, a company of France
Filed May 8, 1967, Ser. No. 636,709
Claims priority, application France, May 6, 1966, 60,663
5 Claims. (Cl. 165—173)

ABSTRACT OF THE DISCLOSURE

In said structural arrangement the various tubes 4 of the nest of tubes of the tubular heat-exchanger are welded endwise to tubular elements 3 and said elements welded to each other over the whole area of their adjacent lateral faces in contact with each other so as to form a tubular plate 1.

---

The present invention relates to the end construction or structural arrangement of the terminal portion of a tubular heat-exchanger, as well as a tubular heat-exchanger embodying such a structure; more particularly, the invention is directed to a heat-exchanger comprising such a construction at both of its ends.

The invention is also concerned with a special method of manufacturing said structural end arrangement.

The invention further concerns heat-exchangers comprising at least one construction or structural arrangement of the aforesaid type, the headers or manifolds embodying an application of such a structure as well as the component tubular elements of said structure.

Heat-exchangers generally consist of a nest, bundle, cluster or bank of straight or bent tubes, connected at their ends to tubular plates accommodated, housed or received in end boxes or casings provided for the inlet and outlet of the fluid flowing through said nest of tubes.

The tubes of the nest of tubes are in most cases fastened or secured in the end tubular plates by rolling expansion or beading, after insertion of their ends into the holes of said plates and/or by welding their end edges to the outer side or face of said plates.

This method of fastening or attachment, which has become conventional suffers however from many drawbacks. In effect, in the case of heat-exchangers wherein at least one of the fluids is at high pressure, therefore when the tube thickness becomes significant with respect to their diameter, it is not possible, in view of the rather large value itself of the outer diameter of said tubes, to reduce enough the distance or spacing between the holes of the tubular plate; moreover, in the case where the outer edges of said tubes are welded on the outer side face of said plates, the least value of this spacing or distance tends to be greater than in the absence of welding, owing to the fact that the welding affects annular areas of the plate, arranged beyond the outer surface of the tubes arranged in a nest; in such cases, the minimum value of said spacing is for example of the order of magnitude ranging from 5 to 6 mm.; this constraint or requirement results in following consequences:

(a) It does not allow, in the case where the inner diameter of the tubes of the nest of tubes becomes very small, for example below 9 or 10 mm., a sufficient reduction or decrease of the cross-sectional passage area for the exchange fluid located outside of the tubes of said nest of tubes;

(b) It makes the fastening or attachment of tubes having a very low inner diameter, for example 9 or 10 mm., difficult and even impossible on the outer side or face of the plates, in the case where the fastening or attachment of said tubes on these plates by rolling expansion or beading is discarded or impractical as for example in heat-exchanger wherein at least one of the two available fluids is a liquid metal, such as sodium or potassium.

The present invention enables to obviate to these inconveniences.

The end construction or structural arrangement of the end portion of a tubular heat-exchanger according to the invention is characterized in that the various tubes of the nest of tubes of the heat-exchanger are welded endwise to tubular elements equal in number to the number of said tubes and said tubular elements are welded to each other over the whole surface area of their lateral faces or sides in engagement with each other, so as to form an integral one-piece tubular plate lying endwise of said nest of tubes and exhibiting the same strength at the level of said welded lateral faces as inside of the material from which are made said elements.

According to a preferred form of embodiment of the invention, the welds at the level of the adjacent lateral faces in engagement with each other are electronic welds.

According to a further feature of the invention, said tubular elements are provided with longitudinal outer recesses or cavities defining longitudinal hollows, cavities or recesses within the tubular plate, so as to improve the strength or resistance thereof to thermal shocks.

A construction according to the invention may be made according to a very convenient and efficient method, characterized in that it consists in welding endwise the various tubes of the heat-exchanger to said tubular elements, arranging at the same level, in parallel relationship and in the same direction, the assemblies so formed and welding then said tubular elements to each other by electronic bombardment throughout the area of their lateral surfaces in engagement with each other.

According to a preferred embodiment of said method, tubular elements with identical polygonal contours are selected, which are adapted to form a network or pattern determining a plurality of sets of continuous lines corresponding to the traces of said lateral faces and the electronic bombardment is effected by successive sweepings along these continuous lines.

This welding through electronic bombardment is started only at the time at which said assemblies have been arranged in the respective positions they ought to assume finally to form the tubular plate (or a portion of said tubular plate when the latter is of very large size), these assemblies being maintained close to each other by an suitable system, such as a peripheral clamping or tightening clip, bridle or flange for instance.

The invention will be better understood and further objects, features and advantages thereof will appear as the following specification proceeds with reference to the accompanying diagrammatic drawings, given by way of illustration only and wherein:

FIGURE 1 shows an end view of a construction of a tubular heat-exchanger end portion according to the invention;

FIGURE 2 is a view in longitudinal cross-section, taken for example upon the line II—II of FIGURE 1, of said end structural arrangement;

FIGURE 3 is a perspective view of a tubular element of the end construction of FIGURES 1 and 2;

FIGURE 4 is an axial longitudinal cross-sectional view of the tubular element of FIGURE 3, on which a tube has been welded;

FIGURE 5 is a perspective view of another type of tubular element of an end structure according to the present invention;

FIGURE 6 is a longitudinal axial cross-sectional view of a tubular heat-exchanger according to the invention;

FIGURE 7 is a view in cross-section, taken upon the line VII—VII of FIGURE 6 of said tubular heat-exchanger;

FIGURE 8 is a cross-sectional view at the level of the end tubular plates of another tubular heat-exchanger according to the invention;

FIGURES 9 and 10 are respective cross-sectional views of two portions of end tubular plates of tubular heat-exchangers, according to the invention;

FIGURE 11 is a longitudinal sectional view of an alternative or modified tubular element of an end construction according to the invention;

FIGURE 12 is a longitudinal sectional view of an end structure according to the invention, formed with tubular elements such as that of FIGURE 11;

FIGURE 13 is a perspective view of a header or manifold connected to two rows of exchange tubes by means of an end structure according to the invention.

Referring to FIGURES 1 to 4, it is seen thereon that an end construction of a tubular heat-exchanger according to the invention essentially consists of a tubular metal-plate 1, formed by a plurality of tubular elements such as 3, welded to each other throughout or over the whole area of their lateral faces in contact with each other; on these elements are butt-welded or welded endwise tubes such as 4 of the nest of tubes 5 of the heat-exchanger.

A tubular element such as 3 consists of a body portion 3a of substantially square cross-sectional shape and of a cylindrical end-piece, muzzle, pipe or nipple portion with a circular or round cross-section, said element being formed with an axial cylindrical duct 3c, having an inner diameter corresponding to the inner diameter of the tube 4, whereas the thickness of the cylindrical end-piece 3b is equal to the thickness of the tube 4.

The tubular element 6 of FIGURE 5 is similar to that 3 of FIGURE 3, but the cross-sectional shape of its body portion 6a, in extension of which is the end-piece 6b is a rhomb instead of being a square; this tubular element is likewise provided with a longitudinal cylindrical duct 6c.

The heat-exhanger of FIGURES 6 and 7 consists essentially of a nest of tubes 7, of tubes or pipes 8, forming at each one of its ends, together or in conjunction with the tubular plates 9a and 9b, an end structure of the type of that of FIGURES 1 to 4 (square meshed-pattern as it is seen on FIGURE 7) and the tubular elements of which are welded to those in the same manner as the structure of said figures.

Since the upper or top walls 10a and 10b of the end boxes or casing 11a and 11b of the heat-exchanger have a cylindrical base, the connection of these upper or top walls with the tubular plates 9a and 9b is effected through the medium of complementary parts such as 12, 13, 14 and 15, the profile of which is such that in conjunction with the square cross-sectional contour of the tubular plates 9a and 9b, the outer contour of the heat-exchanger at the level of said plates is circular, said complementary parts or members 12, 13, 14 and 15 being preferably secured by welding on said upper or top walls and on said tubular plates, throughout or over the whole area of their side faces in engagement with said plates.

On the heat-exchanger, a cross-section of which is shown on FIGURE 8, may be seen a tubular plate 16 of hexagonal contour, connected by welding to complementary or additional parts or members 18, 19, 20, 21, 22 and 23 of suitable profile, so as to provide the cross-section of the heat-exchanger at this level with a circular contour enabling to connect the tubular plate 18 to an end box or casing of conventional type; the tubular plate 16 consists of an assembly of tubular elements 17a of diamond-shaped cross-section, identical with that of FIGURE 5 and by small triangular complementary or additional elements 17b.

In the form of embodiment shown on FIGURES 11 and 12, each tubular element 24 of the tubular plate 25 connected to the tube 26 of the nest of tubes 27, is provided with two longitudinal annular recesses 24a and 24b, adapted to form hollow areas 28 and 29 within the tubular plate 25; such a recessed or hollowed-out plate is but little sensitive to thermal shocks, thereby bringing about a very significant improvement in the field of shielding or protecting the tubular plates against thermal shocks in the heat-exchangers operating at high pressures and high temperatures, as is for example the case for the heat-exchangers operated with liquid metals.

In the alternative embodiment or modification shown on FIGURE 9, the tubular plate 30, only a portion of which has been shown, is formed by the association of tubular elements 31 identical with that of FIGURE 5 and of solid elements 32, made of right prisms the cross-section of which is in the shape of a rhombus.

In the alternative embodiment or modification of FIGURE 10, the outer plate 33, a portion of which only has been shown, is formed by the association of tubular elements 34, identical with those of FIGURE 3 and of solid elements 35 consisting of right prisms the cross-section of which is square-shaped.

FIGURE 13 shows the end structure 36 consisting of two rows of tubular elements 37, which structure is connected by welding to a curved or bent element 38 forming with the outer face or side of said structure, a header or a manifold 39 for the fluid circulating within the exchange tubes 40.

Referring for example to FIGURES 1 to 4 and to FIGURE 6, the method of manufacturing the end structures of the tubular heat-exchanger according to the invention will now be described hereinafter.

Prior to the formation of a nest of tubes such as 5 or 7, a tubular element such as that shown in FIGURE 3 is welded to both ends of each tube of said nest of tubes, so that each end portion of each tube has the construction shown on FIGURE 4; such an endwise or butt-welding may be carried out according to any process known per se.

When all the tubes or pipes of the nest of tubes to be achieved have been provided with tubular elements, the assembly, combination or joining of the nest of tubes is effected while making shift to put the tubular elements located at each one of their ends in the position shown for example by FIGURES 1 and 2, so as to achieve the final geometrical profile of both tubular plates 9a and 9b; the assembly of tubular elements provided with the corresponding tubes is then clamped or tied up externally to keep its cohesion during the welding step, while maintaining said tubular elements in close or tightened relation to each other; thereafter, the welds between the tubular elements of each plate are effected along directions defined by the faces of said elements bearing against each other; the welding operation is effected by electronic bombardment carried out in line, such a method enabling to carry out the welding of elements having large thicknesses without any filler metal and which affects the structure of the parent or base metal of said tubular elements through a very small thickness only (1 to 2 mm.) and this without introducing any significant internal stresses; this welding step is effected successively along the lines $a_1 b_1$, $a_2 b_2$, etc. . . . then along the lines $c_1 d_1$, $c_2 d_2$, $c_3 d_3$, etc. . . . each one of the elementary electronic welding operations being thus carried out along a continuous segment of a straight line both ends of which are free, thereby facilitating the performance of the electronic welding and improving its efficiency or effectiveness. An electron beam source E, as shown diagrammatically in FIG. 1, may be used for the welding operation.

Thereafter, the nest of tubes provided with its two tubular end plates is connected to the complementary pieces or additional parts such as 12, 13, and 14 and 15 also preferably by electronic bombardment in the following sequence or order of succession: 12 and 14, then 13 and 15 in order that the weld lines be free at both of their ends; then said complementary parts or additional members are connected ot the upper or top walls of the end boxes or casings and the side wall 41 (FIGURE 6) is connected or attached on the corresponding complementary parts or additional members of the tubular end plates 9a and 9b, thereby enabling to obtain the heat-exchanger of FIGURE 6.

The method according to the invention may of course be possibly applied to the construction of only one of the ends of the nest of tubes, the tubular plate of the other or opposite end being in this case of the conventional type; a heat-exchanger according to the invention should however preferably have a structure of the aforesaid type at both of its ends.

It is to be understood that the present invention should not be construed as being limited to the forms of embodiments described and shown herein which have been given by way of examples only, as many modifications and alterations may be effected by those skilled in or conversant with the art without departing from the scope of the invention as defined in the appended claims.

I claim:
1. In a tubular heat-exchanger consisting of a casing, of parallel heat-exchange tubes extending longitudinally in said casing and of end portions constituting an inlet and an outlet for the fluid to be circulated therethrough and means to support said tubes, a structural arrangement of at least one of said end portions which consists of an integral one-piece tubular plate comprising parallel tubular elements of polygonal prismatic shape welded endwise to said tubes and having their adjacent lateral faces in reciprocal contact and forming an assembly according to a network-like pattern in which said lateral faces determine at least two directions of planes along which said tubular elements are welded over the whole surface areas of said lateral faces, said welds between said lateral faces are electronic welds, said integral one-piece tubular plate exhibiting the same strength along said welded lateral faces as inside of the material from which are made said elements.

2. An arrangement according to claim 1, wherein said tubular plate has a circular contour and includes complementary parts disposed at the periphery of said assembly.

3. An arrangement according to claim 1, wherein said tubular plate includes longitudinal elements inserted between said tubular elements and welded thereto.

4. A method of manufacturing a structural arrangement of at least one end portion of a tubular heat-exchanger comprising a casing, parallel heat-exchange tubes extending longitudinally in said casing and end portions constituting an inlet and an outlet for the fluid to be circulated therethrough and means to support said tubes, said structural arrangement consisting of an integral one-piece tubular plate comprising parallel tubular elements of polygonal prismatic shape welded endwise to said tubes and having their adjacent lateral faces in reciprocal contact and forming an assembly according to a network-like pattern in which said lateral faces determine at least two directions of planes along which said tubular elements are welded over the whole surface areas of said lateral faces, said integral one-piece tubular plate exhibiting the same strength along said welded lateral faces as inside of the material from which are made said elements, said method comprising the steps of welding endwise said tubes to said tubular elements, of arranging the units so obtained at the same level, in parallel relationship, in reciprocal contact, in the same direction, and so as to form an assembly, corresponding to the network-like patterns to be obtained, in which said lateral faces in reciprocal contact determine at least said two directions of contact planes, of electronically welding said lateral faces over their whole surface areas by directing an electronic beam successively along each of said contact planes.

5. A method according to claim 4, including the step of clamping externally the assembly of said tubular elements provided with said tubes to maintain the cohesion thereof during the electronic welding.

References Cited

UNITED STATES PATENTS

| | | | |
|---|---|---|---|
| 2,268,369 | 12/1941 | Askin | 29—157.3 |
| 2,337,584 | 12/1943 | Baker | 165—148 X |
| 2,396,650 | 3/1946 | Hannah | 165—148 |
| 3,141,807 | 7/1964 | Cook | 165—135 X |
| 3,185,815 | 5/1965 | Anderson | 219—121 X |
| 3,244,226 | 4/1966 | Hettrich | 165—135 |

FOREIGN PATENTS

| | | |
|---|---|---|
| 1,248,568 | 11/1960 | France. |
| 763,274 | 12/1956 | Great Britain. |
| 908,726 | 10/1962 | Great Britain. |

ROBERT A. O'LEARY, *Primary Examiner.*

A. W. DAVIS, *Assistant Examiner.*